United States Patent
Gunderson et al.

(10) Patent No.: US 10,132,389 B2
(45) Date of Patent: Nov. 20, 2018

(54) UPSHIFT SHUDDER MITIGATION THROUGH CLUTCH MANIPULATION

(71) Applicant: GM GLOBAL TECHNOLOGY OPERATIONS LLC, Detroit, MI (US)

(72) Inventors: Joel H. Gunderson, Canton, MI (US); Jeremy V Horgan, Northville, MI (US); Dongxu Li, Troy, MI (US)

( * ) Notice: Subject to any disclaimer, the term of this patent is extended or adjusted under 35 U.S.C. 154(b) by 168 days.

(21) Appl. No.: 15/287,948

(22) Filed: Oct. 7, 2016

(65) Prior Publication Data

US 2017/0363179 A1    Dec. 21, 2017

Related U.S. Application Data

(60) Provisional application No. 62/351,838, filed on Jun. 17, 2016.

(51) Int. Cl.
| | |
|---|---|
| *F16H 3/66* | (2006.01) |
| *F16H 61/04* | (2006.01) |
| *B60W 30/20* | (2006.01) |
| *B60W 30/19* | (2012.01) |

(Continued)

(52) U.S. Cl.
CPC ........... *F16H 3/66* (2013.01); *F16H 61/0437* (2013.01); *B60W 10/115* (2013.01); *B60W 30/19* (2013.01); *B60W 30/20* (2013.01); *B60W 2510/104* (2013.01); *F16H 61/686* (2013.01); *F16H 2200/0069* (2013.01); *F16H 2200/2012* (2013.01); *F16H 2200/2046* (2013.01); *F16H 2200/2066* (2013.01); *F16H 2200/2082* (2013.01); *Y10T 477/6937* (2015.01); *Y10T 477/69383* (2015.01)

(58) Field of Classification Search
CPC ...... Y10T 477/6937; Y10T 477/69383; B60W 10/115; B60W 30/19; B60W 30/20; B60W 2510/104; F16H 3/66; F16H 61/0204; F16H 2200/2046; F16H 2200/2012; F16H 2200/0069
See application file for complete search history.

(56) References Cited

U.S. PATENT DOCUMENTS 7,618,343 B2 *  11/2009  Tabata ................... B60K 6/445
                                                     477/3
8,562,486 B1  10/2013  Eber
(Continued)

*Primary Examiner* — Roger L Pang (57) ABSTRACT

A method and system are provided for shifting a vehicle transmission having several members. Each member is a first, second, or third node of a planetary gear set (of multiple planetary gear sets), or an input, output, or stationary member. A first torque transmitting mechanism is applied to transfer torque between first and second members in a low gear state. In some versions, a second torque transmitting mechanism is applied in the low gear state without substantially transferring torque between third and fourth members, and then the second torque transmitting mechanism is disengaged. A third torque transmitting mechanism is then applied without substantially transferring torque between the third and fourth members in the low gear state. The transmission is upshifted by disengaging the first torque transmitting mechanism, keeping the third torque transmitting mechanism applied, and applying the second torque transmitting mechanism to transfer torque between the third and fourth members.

23 Claims, 2 Drawing Sheets

| 60 | 62 | 64 | A | B | C | D | E | F |
|---|---|---|---|---|---|---|---|---|
| Rev | -4.866 | | X | X | | X | | X |
| N | | -1.04 | | | | | | |
| 1st | 4.696 | | X | X | O | O | X | |
| 2nd | 2.985 | 1.57 | X | X | X | X | | |
| 3rd | 2.146 | 1.39 | X | | X | X | X | |
| 4th | 1.769 | 1.21 | X | | X | X | | X |
| 5th | 1.520 | 1.16 | X | | X | | X | X |
| 6th | 1.275 | 1.19 | X | | | X | X | X |
| 7th | 1.000 | 1.28 | | | X | X | X | X |
| 8th | 0.854 | 1.17 | | X | | X | X | X |
| 9th | 0.689 | 1.24 | | X | X | | X | X |
| 10th | 0.636 | 1.08 | | X | X | X | | X |

(51) Int. Cl.
*B60W 10/115* (2012.01)
*F16H 61/686* (2006.01)

(56) References Cited

U.S. PATENT DOCUMENTS

| | | | |
|---|---|---|---|
| 8,568,274 B2* | 10/2013 | Nakamura | F16H 61/0031 477/143 |
| 9,091,329 B2 | 7/2015 | Otanez | |
| 9,175,752 B2* | 11/2015 | Beck | F16H 3/666 |
| 9,327,715 B2* | 5/2016 | Tanishima | B60W 10/115 |
| 9,925,982 B2* | 3/2018 | Schiele | B60W 10/06 |
| 2011/0034288 A1* | 2/2011 | Phillips | F16H 3/66 475/275 |

\* cited by examiner

Fig-1

| | 60 | 62 | 64 | 32 A | 34 B | 28 C | 26 D | 24 E | 30 F |
|---|---|---|---|---|---|---|---|---|---|
| Rev | -4.866 | | | X | X | | X | | X |
| N | | -1.04 | | | | | | | |
| 1st | 4.696 | | | X | X | ○ | ○ | X | |
| 2nd | 2.985 | 1.57 | | X | X | X | X | | |
| 3rd | 2.146 | 1.39 | | X | | X | X | X | |
| 4th | 1.769 | 1.21 | | X | | X | X | | X |
| 5th | 1.520 | 1.16 | | X | | X | | X | X |
| 6th | 1.275 | 1.19 | | X | | | X | X | X |
| 7th | 1.000 | 1.28 | | | | X | X | X | X |
| 8th | 0.854 | 1.17 | | | X | | X | X | X |
| 9th | 0.689 | 1.24 | | | X | X | | X | X |
| 10th | 0.636 | 1.08 | | | X | X | X | | X |

UPSHIFT SHUDDER MITIGATION THROUGH CLUTCH MANIPULATION

CROSS-REFERENCES TO RELATED APPLICATIONS

This application claims the benefit of U.S. Provisional Patent Application No. 62/351,838, filed on Jun. 17, 2016, which is hereby incorporated by reference in its entirety.

FIELD

The invention relates generally to a system and method of shifting a multiple speed transmission, and more particularly to a method for shifting a transmission having a plurality of planetary gear sets and a plurality of torque transmitting devices.

INTRODUCTION

The statements in this section merely provide background information related to the present disclosure and may or may not constitute prior art.

A typical multiple speed transmission uses a combination of friction clutches, planetary gear arrangements, and fixed interconnections to achieve a plurality of gear ratios. The number and physical arrangement of the planetary gear sets, generally, are dictated by packaging, cost and desired speed ratios.

A drive toward efficiency and better fuel economy has led engineers to design automatic transmissions for motor vehicles that have nine, ten, and eleven forward gear states, for example. However, providing more forward gear states has increased tendency toward shift shudder in the transmissions. Shudder is an oscillatory resonance, which may occur when a shift is being implemented. Shudder can occur at various frequencies within the transmission.

Thus, the objective of increasing the efficiency of a transmission can be at odds with the objective of avoiding undesirable shudder. As between efficiency and avoiding shudder, many in the field have taken the approach that efficiency is more important, and therefore, shudder becomes a concern.

Therefore, while current transmissions achieve their intended purpose, the need for new and improved transmission configurations which exhibit improved performance, especially from the standpoints of efficiency and smoothness. Accordingly, there is a need for a transmission with efficiency and for a smooth shifting with little noticeable shudder.

SUMMARY

The present disclosure provides a system and method for shifting a transmission that switches from holding a first torque transmitting mechanism to holding a second torque transmitting mechanism and enabling the first torque transmitting mechanism to be used to perform an upshift such that the resulting kinematic arrangement produces a higher frequency having reduced shudder.

In one example, which may be combined with or separate from the other examples provided herein, a method for shifting a transmission is provided for a transmission of the type having a plurality of members, the members each being one of a first, second, and third node of a planetary gear set of a plurality of planetary gear sets, an input shaft, an output shaft, and a stationary member. The method includes a step of applying a first torque transmitting mechanism of the plurality of torque transmitting mechanisms to interconnect first and second members of the plurality of members, in a low gear state. The method also includes a step of applying a second torque transmitting mechanism without interconnecting third and fourth members of the plurality of members and disengaging a third torque transmitting mechanism of the plurality of torque transmitting mechanisms, in the low gear state, if a vehicle speed is less than or equal to a predetermined threshold. Further, the method includes disengaging the second torque transmitting mechanism and applying the third torque transmitting mechanism without interconnecting the third and fourth members, in the low gear state, if the vehicle speed exceeds the predetermined threshold. In a higher gear state, the method includes steps of disengaging the first torque transmitting mechanism and applying the second torque transmitting mechanism while simultaneously keeping the third torque transmitting mechanism applied to interconnect the third and fourth members of the plurality of members.

In another example, which may be combined with or separate from the other examples provided herein, a method for shifting a transmission is provided for a transmission of the type having a plurality of members, the members each being one of a first, second, and third node of a planetary gear set of a plurality of planetary gear sets, an input shaft, an output shaft, and a stationary member. The method includes a step of applying a first torque transmitting mechanism of the plurality of torque transmitting mechanisms to interconnect first and second members of the plurality of members, in a low gear state. The method includes a step of initially applying a second torque transmitting mechanism without interconnecting third and fourth members of the plurality of members, in the low gear state. In addition, the method includes a step of disengaging the second torque transmitting mechanism, in the low gear state, subsequent to applying the second torque transmitting mechanism. The method further includes a step of applying a third torque transmitting mechanism without interconnecting the third and fourth members, in the low gear state, subsequent to disengaging the second torque transmitting mechanism. The method includes a step of upshifting from the low gear state to a higher gear state by disengaging the first torque transmitting mechanism, and by applying the second torque transmitting mechanism while simultaneously keeping the third torque transmitting mechanism applied to interconnect the third and fourth members of the plurality of members. The second torque transmitting mechanism is applied subsequent to applying the third torque transmitting mechanism when upshifting from the low gear state to the higher gear state.

In yet another example, which may be combined with or separate from the other examples provided herein, a method for shifting a transmission is provided for a transmission of the type having a plurality of members, the members each being one of a first, second, and third node of a planetary gear set of a plurality of planetary gear sets, an input shaft, an output shaft, and a stationary member. The method includes a step of applying a first torque transmitting mechanism of the plurality of torque transmitting mechanisms to transfer torque between first and second members of the plurality of members, in a low gear speed ratio (low gear state). The method also includes a step of applying a third torque transmitting mechanism without substantially transferring torque between third and fourth members of the plurality of members, in the low gear state. The method further includes disengaging the first torque transmitting mechanism, keeping the third torque transmitting mechanism applied, and applying a second torque transmitting mechanism to transfer torque between the third and fourth members of the plurality of members, in a higher gear state. The higher gear state is sequentially one gear state higher than the low gear state. The second torque transmitting mechanism is applied subsequent to the third torque transmitting mechanism when upshifting from the low gear state to the higher gear state. Applying the second torque transmitting mechanism subsequent to applying the third torque transmitting mechanism when upshifting from the low gear state to the higher gear state results in a higher natural frequency in the transmission than if the third torque transmitting mechanism is applied subsequent to applying the second torque transmitting mechanism when upshifting from the lower gear state to the higher gear state.

In yet another example, which may be combined or separate from the other examples provided herein, this disclosure provides a control system configured to effectuate shifting in a transmission of a motor vehicle. The transmission is of the type a having a plurality of members, the members each being one of a first, second, and third node of a planetary gear set of a plurality of planetary gear sets, an input shaft, an output shaft, and a stationary member. The control system includes a first control logic configured to cause the transmission to apply a first torque transmitting mechanism of the plurality of torque transmitting mechanisms to interconnect first and second members of the plurality of members, when the transmission is in a low gear state. The control system also includes a second control logic configured to determine whether a vehicle speed exceeds a predetermined threshold. The control system further includes a third control logic configured to cause the transmission to apply a second torque transmitting mechanism without interconnecting third and fourth members of the plurality of members and to disengage a third torque transmitting mechanism of the plurality of torque transmitting mechanisms, if a vehicle speed does not exceed the predetermined threshold, when the transmission is in the low gear state. Furthermore, the control system includes a fourth control logic configured to cause the transmission to disengage the second torque transmitting mechanism and apply the third torque transmitting mechanism without interconnecting the third and fourth members, if the vehicle speed exceeds the predetermined threshold, when the transmission is in the low gear state. In addition, the control system includes a fifth control logic configured to cause the transmission to disengage the first torque transmitting mechanism and apply the second torque transmitting mechanism while simultaneously keeping the third torque transmitting mechanism applied to interconnect the third and fourth members of the plurality of members, when the transmission is in a higher gear state.

Further features, aspects and advantages will become apparent by reference to the following description and appended drawings wherein like reference numbers refer to the same component, element or feature.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

In some forms of the present disclosure, a nine, ten, or eleven speed transmission is provided, by way of example, in a relatively small package by achieving nine, ten, or eleven forward speeds with four planetary gear sets, two brakes, and four clutches. In other variations, however, additional brakes, clutches, planetary gear sets, or other components may be added, or deleted, and the disclosed subject matter may be used in transmissions with lower or higher number of gear states.

The automatic transmission illustrated herein has an arrangement of permanent mechanical connections between the elements of the four planetary gear sets. As used herein, coupling or interconnection refers to a direct, continuous, and permanent coupling or interconnection, for example by a rigid member or shaft, between elements. Selective coupling or interconnection, on the other hand, refers to a selective coupling by a clutch or brake, where the clutch or brake can be engaged and disengaged, such that when engaged, the selectively coupled or interconnected elements rotate together, but when disengaged, the selectively coupled or interconnected elements are free to rotate independently.

Figure 1:
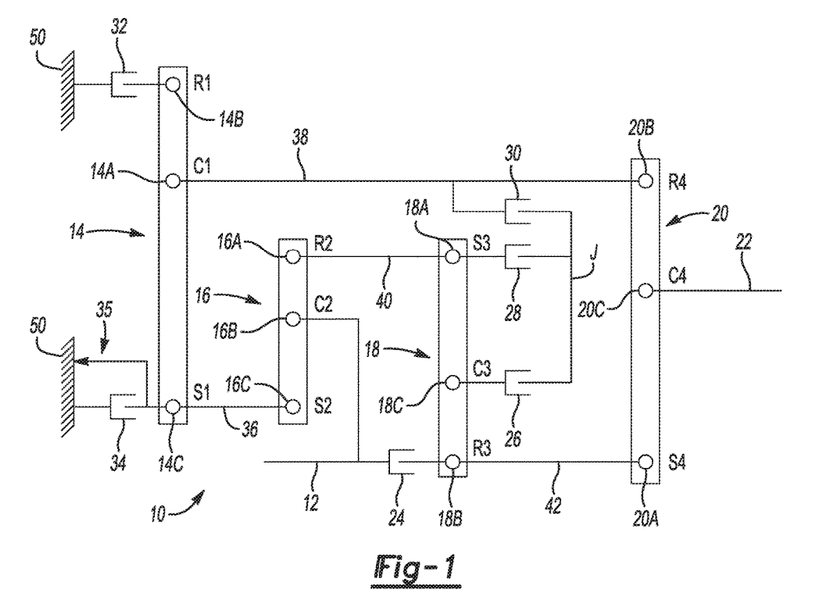
FIG. 1 is a lever diagram of a ten speed transmission utilized for an example of the method and system, according to the principles of the present disclosure.

Referring now to FIG. 1, an example of a ten speed transmission 10 is illustrated in a lever diagram format. A lever diagram is a schematic representation of the components of a mechanical device such as an automatic transmission. Each individual lever represents a planetary gear set wherein the three basic mechanical components of the planetary gear are each represented by a node. Therefore, a single lever contains three nodes: one for the sun gear, one for the planet gear carrier, and one for the ring gear. In some cases, two levers may be combined into a single lever having more than three nodes (typically four nodes). For example, if two nodes on two different levers are interconnected through a fixed connection they may be represented as a single node on a single lever. The relative length between the nodes of each lever can be used to represent the ring-to-sun ratio of each respective gear set. These lever ratios, in turn, are used to vary the gear ratios of the transmission in order to achieve an appropriate ratios and ratio progression. Mechanical couplings or interconnections between the nodes of the various planetary gear sets are illustrated by thin, horizontal lines and torque transmitting devices such as clutches and brakes are presented as interleaved fingers. Further explanation of the format, purpose and use of lever diagrams can be found in SAE Paper 810102, "The Lever Analogy: A New Tool in Transmission Analysis" by Benford and Leising which is hereby fully incorporated by reference. The automatic transmission illustrated in the lever diagram in FIG. 1 is merely one exemplary embodiment of a transmission that may be used with the system and methods disclosed herein, and it should be deemed to limit the invention or its uses.

The transmission 10 includes an input shaft or member 12, a first planetary gear set 14, a second planetary gear set 16, a third planetary gear set 18, a fourth planetary gear set 20, and an output shaft or member 22. In the lever diagram of FIG. 1, the first planetary gear set 14 has three nodes: a first node 14A, a second node 14B, and a third node 14C. The second planetary gear set 16 has three nodes: a first node 16A, a second node 16B, and a third node 16C. The third planetary gear set 18 has three nodes: a first node 18A, a second node 18B, and a third node 18C. The fourth planetary gear set 20 has three nodes: a first node 20A, a second node 20B, and a third node 20C.

The input member 12 is continuously coupled to the second node 16B of the second planetary gear set 16. The output member 22 is continuously coupled to the third node 20C of the fourth planetary gear set 20. The first node 16A of the second planetary gear set 16 is continuously coupled to the first node 18A of the third planetary gear set 18. The second node 18B of the third planetary gear set 18 is continuously coupled to the first node 20A of the fourth planetary gear set 20. The first node 14A of the first planetary gear set 14 is continuously coupled to the second node 20B of the fourth planetary gear set 20. The third node 14C of the first planetary gear set 14 is continuously coupled to the third node 16C of the second planetary gear set 16.

A first torque transmitting device, such as first clutch 24, selectively connects the second node 16B of the second planetary gear set 16 and the input shaft 12 with the second node 18B of the third planetary gear set 18.

A second clutch 26 selectively connects the third node 18C of the third planetary gear set 18 with a rotatable common structural member J, which may be a hub, by way of example. A third clutch 28 selectively connects the first node 18A of the third planetary gear set 18 and the first node 16A of the secondary planetary gear set 16 with the common structural member J. A fourth clutch 30 selectively connects the first node 14A of the first planetary gear set 14 and the second node 20B of the fourth planetary gear set 20 with the common structural member J. As such, of the second, third, and fourth clutches 26, 28, 30, two of the three need to be engaged in order to selectively interconnect any of the nodes through engagement of these clutches 26, 28, 30. Engaging only one single clutch of the group of clutches 26, 28, 30 selectively engageable to interconnect the common structural member J does not result in interconnecting any nodes, and thus, torque is not transferred between any of the nodes 16A, 18A, 18C, 14A, 20B that are clutched to the common structural member J if only one of the clutches 26, 28, 30 is engaged.

A first brake 32 selectively connects the second node 14B of the first planetary gear set 14 with a stationary member or transmission housing 50. A second brake 34 selectively connects the third node 14C of the first planetary gear set 14 with the stationary member or transmission housing 50. A one-way clutch 35 may also connect the third node 14C to ground 50.

The clutches 24, 26, 28, 30 and the brakes 32, 34, may be friction disc clutches, for example, a plurality of interleaved friction and/or non-friction discs in a clutch pack. The friction clutches may have slippage when applied, providing for a smooth shifting transition.

Each planetary gear set 14, 16, 18, 20 includes a sun gear member 14C (S1), 16C (S2), 18A (S3), 20A (S4), a ring gear member 14B (R1), 16A (R2), 18B (R3), 20B (R4), and a planet gear carrier member 14A (C1), 16B (C2), 18C (C3), 20C (C4) that rotatably supports a set of planet gears (not shown). The planetary gear sets 14, 16, 18, 20 are simple planetary gear set in this variation, but in other variations within the scope of the present disclosure, one or more of the planetary gear sets 14, 16, 18, 20 could be a compound planetary gear set.

The first planetary gear set 14 includes a sun gear member 14C (S1), a ring gear member 14B (R1), and a planet gear carrier member 14A (C1) that rotatably supports a set of planet gears (not shown). The sun gear member 14C (S1) is connected for common rotation with a first shaft or interconnecting member 36. The planet carrier member 14A (C1) is connected for common rotation with a second shaft or interconnecting member 38. The planet gears (not shown) are each configured to intermesh with both the sun gear member 14C and the ring gear member 14B, in this embodiment.

The second planetary gear set 16 includes a sun gear member 16C (S2), a ring gear member 16A (R2), and a planet gear carrier member 16B (C2) that rotatably supports a set of planet gears (not shown). The second planetary gear set 16 is a simple planetary gear set in this variation, but in other variations, the second planetary gear set 16 could be a compound planetary gear set. The sun gear member 16C (S2) is connected for common rotation with the first shaft or interconnecting member 36. The ring gear member 16A (R2) is connected for common rotation with a third shaft or interconnecting member 40. The planet carrier member 16B is connected for common rotation with the input member 12. The planet gears (not shown) are each configured to intermesh with both the sun gear member 16C (S2) and the ring gear member 16A (R2), in this variation.

The third planetary gear set 18 includes a sun gear member 18A (S3), a ring gear member 18B (R3), and a planet gear carrier member 18C (C3) that rotatably supports a set of planet gears (not shown). The third planetary gear set 18 is a simple planetary gear set in this variation, but in other variations of the present disclosure, the third planetary gear set 18 could be a compound planetary gear set. The sun gear member 18A (S3) is connected for common rotation with the third shaft or interconnecting member 40. The ring gear member 18B (R3) is connected for common rotation with a fourth shaft or interconnecting member 42. The planet gears (not shown) are each configured to intermesh with both the sun gear member 18A (S3) and the ring gear member 18B (R3), in this example.

The fourth planetary gear set 20 includes a sun gear member 20A (S4), a ring gear member 20B (R4), and a planet gear carrier member 20C (C4) that rotatably supports a set of planet gears (not shown). The fourth planetary gear set 20 is a simple planetary gear set in this variation, but in other variations of the present disclosure, the fourth planetary gear set 20 could be a compound planetary gear set. The sun gear member 20A (S4) is connected for common rotation with the fourth shaft or interconnecting member 42. The ring gear member 20B (R4) is connected for common rotation with the second shaft or interconnecting member 38. The carrier member 20C (C4) is continuously connected for common rotation with the output member 22. The planet gears (not shown) are each configured to intermesh with both the sun gear member 20A (S4) and the ring gear member 20B (R4), in this example.

The input shaft or member 12 is continuously connected or connectable to an engine (not shown), to a turbine of a torque converter (not shown), or to an electric motor (not shown). The output shaft or member 22 is continuously connected with the final drive unit or transfer case (not shown).

The torque-transmitting mechanisms or clutches 24, 26, 28, 30 and brakes 32, 34 allow for selective interconnection of the shafts or interconnecting members, members of the planetary gear sets, rotational hubs, and the transmission housing. For example, the first clutch 24 is selectively engageable to connect the input shaft or member 12 with the fourth shaft or interconnecting member 42.

Figure 2:
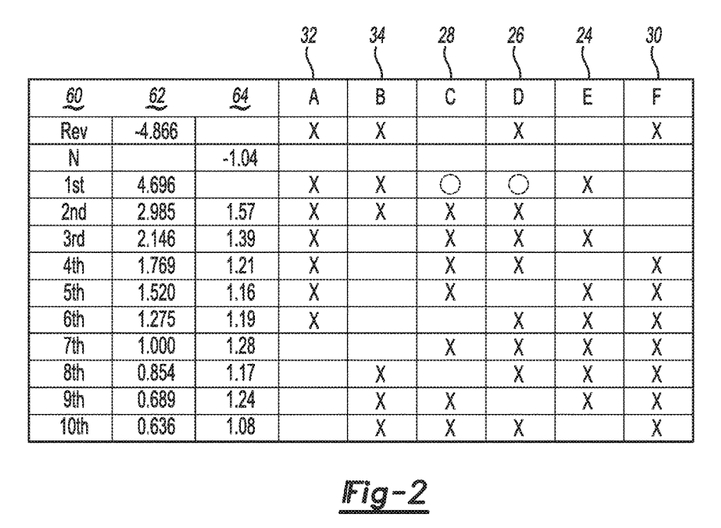
FIG. 2 is a truth table presenting the state of engagement of the various torque transmitting elements in each of the available forward and reverse speeds or gear states of the transmission illustrated in FIG. 1, in accordance with the principles of the present disclosure.

Referring now to FIG. 2, the operation of the ten speed transmission 10 will be described. It will be appreciated that transmission 10 is capable of transmitting torque from the input shaft or member 12 to the output shaft or member 22 in at least ten forward speed torque ratios and at least one reverse speed or torque ratio. Each forward and reverse speed or torque ratio is attained by engagement of one or more of the torque-transmitting mechanisms (i.e. first clutch 24, second clutch 26, third clutch 28, fourth clutch 30, first brake 32, and second brake 34).

FIG. 2 is a truth table presenting the various combinations of torque-transmitting mechanisms that are activated or engaged to achieve the various gear states. Gear state 60 is indicated in a first column, gear ration 62 is indicated in a second column, and ratio step 64 is indicated a third column (from left to right).

An "X" in the box means that the particular clutch or brake is engaged to achieve the desired gear state. An "O" represents that the particular active, but not carrying torque. In this example, the dashed "O's" represent that only one (not both) of the two torque transmitting mechanisms 26, 28 can be applied in the first gear state, but either one of the torque transmitting mechanisms 26, 28 may be applied in the first gear state. Actual numerical gear ratios of the various gear states are also presented although it should be appreciated that these numerical values are exemplary only and that they may be adjusted over significant ranges to accommodate various applications and operational criteria of the transmission 10. Of course, other gear ratios are achievable depending on the gear diameter, gear teeth count and gear configuration selected.

For example, to establish a reverse gear, both brakes 32, 34 are applied, the second clutch 26 is applied and the fourth clutch 30 is applied. Likewise, the ten forward ratios are achieved through different combinations of clutch and brake engagement, as shown in FIG. 2.

It will be appreciated that the foregoing explanation of operation and gear states of the ten speed transmission 10 assumes, first of all, that all the clutches not specifically referenced in a given gear state are inactive or disengaged and, second of all, that during gear shifts, i.e., changes of gear state, between at least adjacent gear states, a clutch engaged or activated in both gear states will remain engaged or activated.

Thus, when shifting between reverse and first gear through neutral, both brakes 32, 34 remain engaged and the clutch 26 is held initially. The clutch 30 is disengaged.

When then shifting from first gear to second gear, both brakes 32, 34 again remain engaged, and the first clutch 24 is disengaged. Since the second clutch 26 is needed for both reverse and second gears, and it is optional (exclusive of clutch 28) for first gear, the natural choice would be to leave clutch 26 applied while shifting between reverse, neutral, first, and second gears. In that case, applying the third clutch 28 would effect the upshift into second gear. Both the second and third clutches 26, 28 need to be applied for torque to be transferred through the rotatable structure hub to interconnect any nodes of the second, third, or fourth planetary gear assemblies 16, 18, 20.

However, the inventors hereof determined that shudder occurred with this upshift, and they also determined that effecting the upshift from first gear to second gear by application of the third clutch 28 caused the transmission assembly to resonate at a low, unpleasant frequency that caused shudder. The inventors determined that effectuating the upshift from first gear to second gear resonated at a much higher oscillatory frequency (and was thus harder to hear and more desirable) when effectuating the upshift from first to second gear with the second clutch 26. In other words, instead of holding the second clutch 26 through reverse, first, and second gears, the second clutch 26 was released and the third clutch 28 was applied in first gear, and then the second clutch 26 was used to effect the upshift from first to second gears. Because the natural frequency was higher when effecting the upshift into second gear by applying the second clutch 26 after the third clutch 28 was already applied, shudder was reduced and not as perceptible to the driver.

The present disclosure provides a system and method of shifting, wherein the second clutch 26 is applied (or left applied) in first gear when the vehicle speed is low so that shifts from drive to reverse only require application of one clutch (the fourth clutch 30). When the vehicle reaches a speed where an upshift to second gear is imminent, however, the second clutch 26 is released in first gear and the third clutch 28 is applied in first gear. Then, when the upshift from first to second gear occurs, only the second clutch 26 needs to be applied, and shudder is low because the natural frequency caused by effecting the first-to-second gear upshift via the second clutch 26 is high.

In another variation, when the vehicle system is moving toward upshifting, the second clutch 26 is initially applied in first gear, but then the second clutch 26 is released and the third clutch 28 is applied in first gear. That way, the upshift to second gear can be accomplished by simply engaging one clutch: the second clutch 26, which will result in little shudder.

Figure 3:
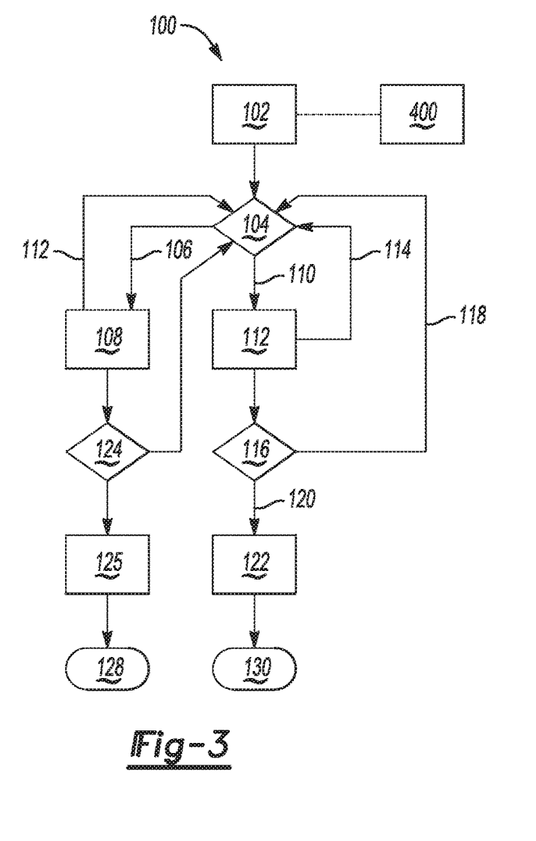
FIG. 3 is a block diagram illustrating an example of a method in accordance with the principles of the present disclosure.

Referring now to FIG. 3, an example of a method for shifting a transmission, such as the transmission 10 described above, in accordance with the present disclosure, will now be described. The method is schematically illustrated in FIG. 3 and generally designated at 100. The method includes a step 102 of applying a first torque transmitting mechanism of the plurality of torque transmitting mechanisms to interconnect first and second members of the plurality of members, in a low gear state, such as first gear.

The method 100 then determines in step 104 whether a vehicle speed is less than or equal to a predetermined threshold. If yes, the method 100 proceeds along path 106 to step 108, where the method 100 includes in step 108 applying a second torque transmitting mechanism, such as clutch 26, and disengaging a third torque transmitting mechanism, such as clutch 28. Note that clutch 26 may already be engaged, and clutch 28 may already be disengaged if, for example, the vehicle was previously in reverse. Step 108 occurs when the vehicle is in the low gear state, such as first gear. When the second clutch 26 is engaged and the third clutch 28 is disengaged, no torque is transferred between the first and third nodes 18A, 18C of the third planetary gear assembly 18.

If in step 104 it is determined that the vehicle speed does exceed a predetermined threshold, then the method proceeds along path 110 to the step 112 of disengaging the second torque transmitting mechanism 26 and applying the third torque transmitting mechanism 28. The third torque transmitting mechanism, or clutch 28 may already be engaged, and the second clutch 26 may already be disengaged if, for example, the vehicle was previously in second gear. Step 112 also occurs when the vehicle is in the low gear state, such as first gear. When the second clutch 26 is disengaged and the third clutch 28 is engaged, no torque is transferred between the first and third nodes 18A, 18C of the third planetary gear assembly 18. Both steps 108, 112 may have a timed feedback loop 114, 116 referring back to the determination of the vehicle speed in step 104. From step 112, the method 100 proceeds to a step 116 of inquiring whether an upshift from the low gear state (such as first gear) to the higher gear state (such as second gear) should occur. If not, the method 100 loops back to step 104 along path 118. If the upshift should occur, the method 100 proceeds along path 120 to a step 122, in a higher gear state (such as second gear), disengaging the first torque transmitting mechanism 24, and applying the second torque transmitting mechanism 26 while simultaneously keeping the third torque transmitting mechanism 28 applied to interconnect the third and fourth members of the plurality of members.

From step 108, the method 100 may proceed to inquire whether the transmission is being downshifted or put into reverse in step 124. If yes, the fourth clutch 30 can be applied in step 125 to put the transmission 10 in reverse, or the vehicle could be configured to downshift to a lower gear, rather than going into reverse. If the transmission is not being downshifted, the method 100 would loop back to step 104 to determine the vehicle speed. If the transmission is shifted in steps 125 or 122, then the method 100 ends at step 128 or 130 and the normal shifting algorithm takes over, but the method 100 can be configured to start again if the transmission returns to first gear.

Applying each of the second and third torque transmitting mechanisms 26, 28 separately and non-simultaneously in the low gear state results in substantially no torque being transferred between the third and fourth members. However, applying both the second and third torque transmitting mechanisms 26, 28 in an overlapping manner results in torque being transferred between the members (such as two of the nodes) because both the second and third clutches 26, 28 connect to the hub J when applied.

As such, the method and system allow the transmission to apply the second clutch 26 needed for reverse when the vehicle is traveling at a low speed and a reverse shift is more likely; and the transmission applies the third clutch 28 in anticipation of an upshift from first to second gear (with the upshift being ultimately effected by the second clutch 26) when the vehicle is traveling at higher speeds such that an upshift from first to second gear is more likely.

Figure 4:
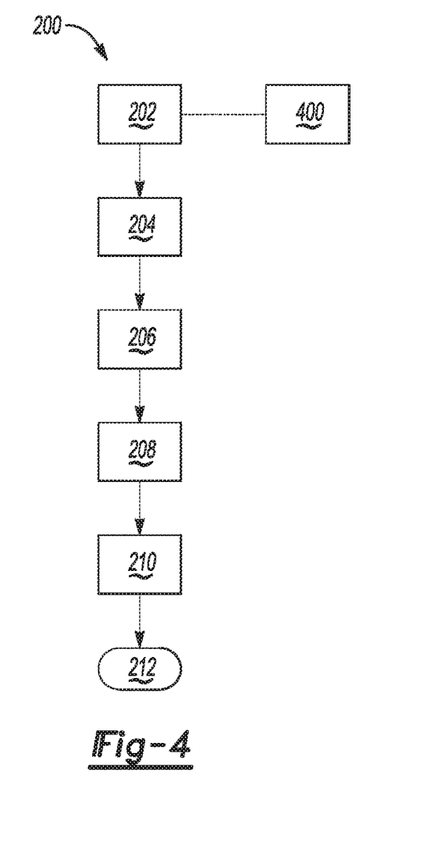
FIG. 4 is a block diagram illustrating another example of a method in accordance with the principles of the present disclosure.

Another variation of a method for shifting a transmission of a motor vehicle is illustrated and generally designated at 200. The method 200 is a process for upshifting from first to second gear (or from a lower gear to a higher gear). The method 200 includes a step 202 of applying a first torque transmitting mechanism, such as the first clutch 24, to interconnect first and second members, which may be any nodes 14A, 14B, 14C, 16A, 16B, 16C, 18A, 18B, 18C, 20A, 20B, 20C, the input member 12, the output member 22, or the stationary member (transmission case 50). Step 202 occurs in a low gear state, such as first gear. The clutch 24 is engaged in first gear, as shown on the truth table in FIG. 2.

The method 200 then proceeds to step 204 of initially applying a second torque transmitting mechanism, such as the second clutch 26, without interconnecting members belonging to the planetary assemblies, the input/output members, or the stationary member(s). As long as clutches 28 or 30 are not applied simultaneously with clutch 26, then none of the planetary nodes, input, output, or stationary member will be connected.

As an upshift becomes imminent, the following additional steps could be used in the method disclosed. In step 206, subsequent to applying the second torque transmitting mechanism (clutch 26) in step 204, the method 200 includes disengaging the second torque transmitting mechanism 26. Steps 204 and 206 occur in a low gear state, such as first gear.

In step 208, subsequent to disengaging the second torque transmitting mechanism (clutch 26), the method 200 includes applying a third torque transmitting mechanism, such as clutch 28, without interconnecting planetary members or the input or output. As long as clutches 26 or 30 are not applied simultaneously with the third clutch 28, then none of the planetary nodes, input, output, or stationary member will be connected.

The method 200 then includes an upshifting step 210 of upshifting from the low gear state to a higher gear state (such as from first gear to second gear) by disengaging the first torque transmitting mechanism (e.g., clutch 24), and by applying the second transmitting mechanism (clutch 26) while simultaneously keeping the third torque transmitting mechanism (clutch 28) applied to interconnect members of the plurality of members (nodes, input/output, or case). The second torque transmitting mechanism (e.g., clutch 26) is applied subsequent to applying the third torque transmitting mechanism (e.g., clutch 28) when upshifting from the low gear state to the higher gear state. After step 210, the method 200 can end at step 212 and start up again if the vehicle goes back into the lower gear mode (first gear in the example of FIG. 2).

Any variations disclosed herein can be incorporated into the variations of methods. Furthermore, either of the previous methods 100, 200 can implement a control system 400 configured to effectuate shifting in a transmission 10, based either on the methods 100, 200 described or other criteria disclosed herein.

For example, the control system 400 could have a first control logic configured to cause the transmission to apply a first torque transmitting mechanism of the plurality of torque transmitting mechanisms to interconnect first and second members of the plurality of members, when the transmission is in a low gear state; a second control logic configured to determine whether a vehicle speed exceeds a predetermined threshold; a third control logic configured to cause the transmission to apply a second torque transmitting mechanism without interconnecting third and fourth members of the plurality of members and to disengage a third torque transmitting mechanism of the plurality of torque transmitting mechanisms, if a vehicle speed does not exceed the predetermined threshold, when the transmission is in the low gear state; a fourth control logic configured to cause the transmission to disengage the second torque transmitting mechanism and apply the third torque transmitting mechanism without interconnecting the third and fourth members, if the vehicle speed exceeds the predetermined threshold, when the transmission is in the low gear state; and a fifth control logic configured to cause the transmission to disengage the first torque transmitting mechanism and apply the second torque transmitting mechanism while simultaneously keeping the third torque transmitting mechanism applied to interconnect the third and fourth members of the plurality of members, when the transmission is in a higher gear state. The method 400 could also include a fifth control logic configured to apply the second torque transmitting mechanism and a fourth torque transmitting mechanism to interconnect the third member with a fifth member of the plurality of members, if the transmission is in an underlying gear state, the underlying gear state being one of the following: a reverse gear state and a gear state lower than the low gear state.

As above, each of the clutches and/or brakes applied clutches may have pressure applied to them such that they are partially engaged, or they may be fully engaged or locked, as desired.

In addition, while the methods 100, 200 are illustrated for use with transmissions illustrated in FIGS. 1-2, the methods 100, 200 described herein could be used with any other suitable transmission. The description of the invention is merely exemplary in nature and variations that do not depart from the gist of the invention are intended to be within the scope of the invention. Such variations are not to be regarded as a departure from the spirit and scope of the invention.

What is claimed is:

1. A method for shifting a transmission of a motor vehicle, the transmission having a plurality of members, the members each being one of a first, second, and third element of a planetary gear set of a plurality of planetary gear sets, an input shaft, an output shaft, and a stationary member, the method comprising:
   in a low gear state, applying a first torque transmitting mechanism of the plurality of torque transmitting mechanisms to interconnect first and second members of the plurality of members;
   in the low gear state, if a vehicle speed is less than or equal to a predetermined threshold, applying a second torque transmitting mechanism without interconnecting third and fourth members of the plurality of members and disengaging a third torque transmitting mechanism of the plurality of torque transmitting mechanisms;
   in the low gear state, if the vehicle speed exceeds the predetermined threshold, disengaging the second torque transmitting mechanism and applying the third torque transmitting mechanism without interconnecting the third and fourth members; and
   in a higher gear state, disengaging the first torque transmitting mechanism, and applying the second torque transmitting mechanism while simultaneously keeping the third torque transmitting mechanism applied to interconnect the third and fourth members of the plurality of members.

2. The method according to claim 1, the higher gear state being sequentially one gear state higher than the low gear state.

3. The method according to claim 2, wherein applying each of the second and third torque transmitting mechanisms separately and non-simultaneously in the low gear state results in substantially no torque being transferred between the third and fourth members; and applying both the second and third torque transmitting mechanisms in an overlapping manner results in torque being transferred between the third and fourth members.

4. The method according to claim 3, further comprising:
   providing a rotatable common structural member, wherein applying the second torque transmitting mechanism interconnects the third member with the rotatable common structural member, and wherein applying the third torque transmitting mechanism interconnects the fourth member with the rotatable common structural member.

5. The method according to claim 4, further comprising:
   in an underlying gear state, applying the second torque transmitting mechanism and a fourth torque transmitting mechanism to interconnect the third member with a fifth member of the plurality of members, the underlying gear state being one of the following: a gear state lower than the low gear state and a reverse gear.

6. The method according to claim 5, wherein applying the fourth torque transmitting mechanism interconnects the fifth member with the rotatable common structural member, the method further comprising providing the rotatable common structural member as being disengageable from each of the third, fourth, and fifth members.

7. The method according to claim 6, further comprising:
   providing the underlying gear state as a reverse gear state;
   providing the low gear state as a first gear state; and
   providing the higher gear state as a second gear state of the transmission.

8. The method according to claim 7, further comprising providing:
   a first interconnecting member continuously interconnecting the fourth member with a first element of a second planetary gear set of the plurality of planetary gear sets, the fourth member being a first element of a third planetary gear set of the plurality of planetary gear sets;
   a second interconnecting member continuously interconnecting a second element of the second planetary gear set with the input shaft;
   a third interconnecting member continuously interconnecting a second element of the third planetary gear set with a first element of a fourth planetary gear set of the plurality of planetary gear sets;
   a fourth interconnecting member continuously interconnecting a second element of the fourth planetary gear set with a first element of a first planetary gear set of the plurality of planetary gear sets;
   a fifth interconnecting member continuously interconnecting the third element of the first planetary gear set with the third element of the second planetary gear set, the third element of the fourth planetary gear set being continuously interconnected with the output shaft; and
   a fifth torque transmitting mechanism and a sixth torque transmitting mechanism, wherein the first, second, third, fourth, fifth, and sixth torque transmitting mechanisms are selectively engageable in combinations of at least three to establish at least ten forward speed ratios and at least one reverse speed ratio between the input shaft and the output shaft.

9. The method according to claim 8, further comprising:
   providing the fifth torque transmitting mechanism as being selectively engageable to interconnect a second element of the first planetary gear set with the stationary member; and
   providing the sixth torque transmitting mechanism as being selectively engageable to interconnect a third element of the first planetary gear set with the stationary member,
   wherein the third elements of the first and second planetary gear sets and the first elements of the third and fourth planetary gear sets are provided as sun gear members; wherein the first element of the first planetary gear set, the second element of the second planetary gear set, and the third elements of the third and fourth planetary gear sets are provided as planetary gear carrier members; and wherein the first element of the second planetary gear set and the second elements of the first, third, and fourth planetary gear sets are provided as ring gear members.

10. A method for shifting a transmission of a motor vehicle, the transmission having a having a plurality of members, the members each being one of a first, second, and third element of a planetary gear set of a plurality of planetary gear sets, an input shaft, an output shaft, and a stationary member, the method comprising:
   in a low gear state, applying a first torque transmitting mechanism of the plurality of torque transmitting mechanisms to interconnect first and second members of the plurality of members;
   in the low gear state, initially applying a second torque transmitting mechanism without interconnecting third and fourth members of the plurality of members;
   in the low gear state, subsequent to applying the second torque transmitting mechanism, disengaging the second torque transmitting mechanism;
   in the low gear state, subsequent to disengaging the second torque transmitting mechanism, applying a third torque transmitting mechanism without interconnecting the third and fourth members; and
   upshifting from the low gear state to a higher gear state by disengaging the first torque transmitting mechanism, and by applying the second torque transmitting mechanism while simultaneously keeping the third torque transmitting mechanism applied to interconnect the third and fourth members of the plurality of members, the second torque transmitting mechanism being applied subsequent to applying the third torque transmitting mechanism when upshifting from the low gear state to the higher gear state.

11. The method according to claim 10, further comprising:
   further comprising providing the higher gear state as being sequentially one gear state higher than the low gear state,
   wherein applying each of the second and third torque transmitting mechanisms separately and non-simultaneously results in substantially no torque being transferred between the third and fourth members, and wherein applying both the second and third torque transmitting mechanisms in an overlapping manner results in torque being transferred between the third and fourth members.

12. The method according to claim 11, further comprising determining a vehicle speed, wherein the step of applying the second torque transmitting device in the low gear state is performed when the vehicle speed is less than a predetermined threshold.

13. The method according to claim 12, wherein the steps of disengaging the second torque transmitting device in the low gear state and applying the third torque transmitting device in the low gear state are performed when the vehicle speed is greater than the predetermined threshold.

14. The method according to claim 13, further comprising providing a rotatable common structural member, wherein applying the second torque transmitting mechanism interconnects the third member with the rotatable common structural member, and wherein applying the third torque transmitting mechanism interconnects the fourth member with the rotatable common structural member.

15. The method according to claim 14, further comprising:
   in an underlying gear state, the underlying gear state being one of a reverse gear and a forward gear state lower than the low gear state, applying the second torque transmitting mechanism and a fourth torque transmitting mechanism to interconnect the third member with a fifth member of the plurality of members.

16. The method according to claim 15, wherein applying the fourth torque transmitting mechanism interconnects the fifth member with the rotatable common structural member, the method further comprising providing the rotatable common structural member as being disengageable from each of the third, fourth, and fifth members.

17. The method according to claim 16, further comprising providing the underlying gear state as a reverse gear state, providing the low gear state as a first gear state, and providing the higher gear state as a second gear state of the transmission.

18. The method according to claim 17, further comprising providing:
   a first interconnecting member continuously interconnecting the fourth member with a first element of a second planetary gear set of the plurality of planetary gear sets, the fourth member being a first element of a third planetary gear set of the plurality of planetary gear sets;
   a second interconnecting member continuously interconnecting a second element of the second planetary gear set with the input shaft;
   a third interconnecting member continuously interconnecting a second element of the third planetary gear set with a first element of a fourth planetary gear set of the plurality of planetary gear sets;
   a fourth interconnecting member continuously interconnecting a second element of the fourth planetary gear set with a first element of a first planetary gear set of the plurality of planetary gear sets;
   a sixth interconnecting member continuously interconnecting the third element of the first planetary gear set with the third element of the second planetary gear set, the third element of the fourth planetary gear set being continuously interconnected with the output shaft; and
   a fifth torque transmitting mechanism and a sixth torque transmitting mechanism, wherein the first, second, third, fourth, fifth, and sixth torque transmitting mechanisms are selectively engageable in combinations of at least three to establish at least ten forward speed ratios and at least one reverse speed ratio between the input shaft and the output shaft.

19. The method according to claim 18, further comprising:
   providing the fifth torque transmitting mechanism as being selectively engageable to interconnect a second element of the first planetary gear set with the stationary member; and
   providing the sixth torque transmitting mechanism as being selectively engageable to interconnect a third element of the first planetary gear set with the stationary member,
   wherein the third elements of the first and second planetary gear sets and the first elements of the third and fourth planetary gear sets are provided as sun gear members; wherein the first element of the first planetary gear set, the second element of the second planetary gear set, and the third elements of the third and fourth planetary gear sets are provided as planetary gear carrier members; and wherein the first element of the second planetary gear set and the second elements of the first, third, and fourth planetary gear sets are provided as ring gear members.

20. The method according to claim 19, wherein applying the second torque transmitting mechanism subsequent to applying the third d torque transmitting mechanism when upshifting from the low gear state to the higher gear state results in a higher natural frequency in the transmission than if the third torque transmitting mechanism is applied subsequent to the second torque transmitting mechanism when upshifting from the low gear state to the higher gear state.

21. A control system configured to effectuate shifting in a transmission of a motor vehicle, the transmission having a plurality of members, the members each being one of a first, second, and third element of a planetary gear set of a plurality of planetary gear sets, an input shaft, an output shaft, and a stationary member, the control system comprising:
  a first control logic configured to cause the transmission to apply a first torque transmitting mechanism of the plurality of torque transmitting mechanisms to interconnect first and second members of the plurality of members, when the transmission is in a low gear state;
  a second control logic configured to determine whether a vehicle speed exceeds a predetermined threshold;
  a third control logic configured to cause the transmission to apply a second torque transmitting mechanism without interconnecting third and fourth members of the plurality of members and to disengage a third torque transmitting mechanism of the plurality of torque transmitting mechanisms, if a vehicle speed does not exceed the predetermined threshold, when the transmission is in the low gear state;
  a fourth control logic configured to cause the transmission to disengage the second torque transmitting mechanism and apply the third torque transmitting mechanism without interconnecting the third and fourth members, if the vehicle speed exceeds the predetermined threshold, when the transmission is in the low gear state; and
  a fifth control logic configured to cause the transmission to disengage the first torque transmitting mechanism and apply the second torque transmitting mechanism while simultaneously keeping the third torque transmitting mechanism applied to interconnect the third and fourth members of the plurality of members, when the transmission is in a higher gear state.

22. The control system of claim 21, further comprising a sixth control logic configured to apply the second torque transmitting mechanism and a fourth torque transmitting mechanism to interconnect the third member with a fifth member of the plurality of members, if the transmission is in an underlying gear state, the underlying gear state being one of the following: a reverse gear state and a forward gear state lower than the low gear state.

23. The control system of claim 22, wherein the underlying gear state is a reverse gear state, the low gear state is a first gear state, and the higher gear state is a second gear state of the transmission.

* * * * *